United States Patent [19]

Leitz et al.

[11] Patent Number: 4,754,017

[45] Date of Patent: Jun. 28, 1988

[54] PROCESS FOR THE PREPARATION OF LINEAR ALIPHATIC POLYCARBONATE FROM CYCLIC ALIPHATIC CARBONATE

[75] Inventors: Edgar Leitz, Dormagen; Christian Lindner, Cologne; Herbert Eichenauer, Dormagen; Karl-Heinz Ott, Leverkusen; Hans-Josef Buysch, Krefeld; Peter Mues, Duisburg; Hartwig Höcker, Eckersdorf; Helmut Keul, Karlsruhe, all of Fed. Rep. of Germany

[73] Assignee: Bayer Aktiengesellschaft, Leverkusen, Fed. Rep. of Germany

[21] Appl. No.: 17,879

[22] Filed: Feb. 24, 1987

[30] Foreign Application Priority Data

Mar. 7, 1986 [DE] Fed. Rep. of Germany ....... 3607625

[51] Int. Cl.$^4$ .............................................. C08G 63/62

[52] U.S. Cl. ................................... 528/371; 528/196; 528/370

[58] Field of Search ........................ 528/371, 370, 196

[56] References Cited

U.S. PATENT DOCUMENTS 3,220,980 11/1965 Prochaska ........................... 528/371

*Primary Examiner*—Harold D. Anderson
*Attorney, Agent, or Firm*—Connolly & Hutz

[57] ABSTRACT

Process for the polymerization of cyclic aliphatic carbonates in the presence of aprotic organic solvents with exclusion of atmospheric oxygen and atmospheric moisture, wherein organometallic compounds of elements of main group 1 of the periodic table are used as initiators, the monomer/solvent ratio is in the range from 1 part by weight to 50 parts by weight of monomer per 100 parts by weight of solvent and the polymerization temperature is between −100° C. and +20° C.

7 Claims, No Drawings

PROCESS FOR THE PREPARATION OF LINEAR ALIPHATIC POLYCARBONATE FROM CYCLIC ALIPHATIC CARBONATE

The present invention relates to a polymerization process for the preparation of homopolymers of cyclic aliphatic carbonates in the presence of aprotic organic solvents.

German Offenlegungsschriften Nos. 1,545,116 and 1,545,117 describe the polymerization of cyclic aliphatic carbonates using organometallic compounds as catalysts. Bulk polymerization at temperatures preferably in the region of about 90° C. is carried out there as the preferred process.

German Offenlegungsschriften Nos. 3,103,135 and 3,204,078 prescribe the use of alkaline thallium compounds as catalysts for polymerization of cyclic carbonates.

The present invention relates to a process for the preparation of linear aliphatic polycarbonates from cyclic aliphatic carbonates with the following features:

1. The polymerization is carried out in the sense of a "living" anionic polymerization in the presence of aprotic organic solvents using organometallic compounds of elements of main group 1 of the periodic table as initiators.
2. The monomer/solvent weight ratio is in the range from 1 to 50:100, preferably 5 to 20:100 and particularly preferably 7 to 12:100.

A preferred embodiment of the process according to the invention is characterized in that 1. organolithium compounds, preferably n-butyl-lithium and s-butyl-lithium, are used as the initiators, 2. aromatic or aliphatic hydrocarbons or cyclic ethers, preferably toluene or tetrahydrofuran, are used as the aprotic organic solvents, 3. the monomer/solvent weight ratio is 7 to 12:100, 4. the polymerization is carried out in a temperature range from −50° C. to 0° C. and 5. the polymerization is carried out in an inert atmosphere (argon, nitrogen) and with the exclusion of atmospheric oxygen and atmospheric moisture.

Another preferred embodiment is distinguished in that 1. the polymerization temperature is below the ceiling temperature of the polymer, preferably in the range from −50° C. to 0° C., 2. agents for desactivation of the polymerization-reative centres are added after conversion is complete and before side reactions start, for example "back-biting" reactions, the desactivator preferably being employed in a molar excess, and 3. the molar mass of the polymer can be adjusted via the initiator/monomer ratio.

Cyclic aliphatic carbonates are polymerized in aprotic organic solvents in the sense of a "living" anionic polymerization by the process according to the invention.

The polymerization is carried out in an inert atmosphere (argon, nitrogen) and in the absence of atmospheric oxygen and atmospheric moisture.

Cyclic aliphatic carbonates in the context of the invention are compounds of the formula (I)

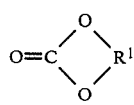

wherein
R$^1$ denotes —(CH$_2$)$_n$—, where n=3–6, —CH$_2$CH$_2$CH(CH$_3$)—, —CH$_2$CH$_2$OCH$_2$CH$_2$OCH$_2$CH$_2$—

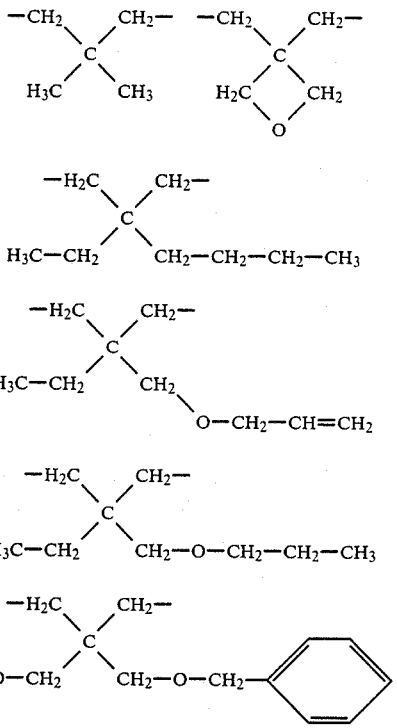

and of the formula (II)

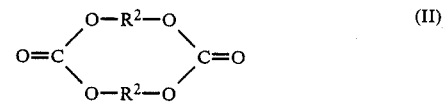

wherein
R$^2$ denotes —(CH$_2$)$_n$—, where n=4–12, —CH$_2$CH$_2$OCH$_2$CH$_2$— or —CH$_2$CH$_2$OCH$_2$CH$_2$OCH$_2$CH$_2$ Carbonates of the formula (I) are preferably used.
The carbonate of the formula

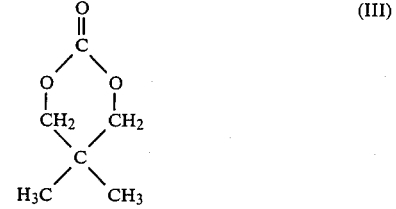

is particularly preferred.

Initiators in the sense of the invention are organometallic compounds of the alkali metals with the general formula MR$^3$.

M designates the alkali metal (lithium, sodium, potassium) and R$^3$ designates a monovalent hydrocarbon, which can be aliphatic, aromatic or alicyclic in nature. Lithium is the preferred alkali metal.

Preferred inititators are n-butyllithium and sec.-butyllithium.

Aromatic and aliphatic hydrocarbons, such as benzene, toluene, xylene, pentane, hexane and cycloheptane, are used as aprotic solvents in the sense of the invention.

Cyclic ethers, such as tetrahydrofuran or tetrahydropyran, or mixtures of aromatic (aliphatic) hydrocarbons and cyclic ethers are also suitable solvents. The preferred solvents are toluene and tetrahydrofuran.

Preferably 1–50 parts by weight, particularly preferably 5–20 parts by weight and especially 7–12 parts by weight, of carbonate per 100 parts by weight of solvent are employed in the polymerization.

The polymerization in the sense of the invention can be carried out at temperatures from −100° C. to +20° C., preferably at −50° C. to 0° C.

Desactivators in the sense of the invention are protic compounds, such as, for example, water, alcohols, acids or mixtures thereof.

Other desactivators are electrophilic, aprotic compounds, such as alkyl or aryl halides (in particular methyl chloride, methyl iodide or benzyl chloride), carboxylic acid chlorides (in particular benzoyl chloride, acetyl chloride or chloroformic acid esters), carboxylic acid anhydrides (in particular acetic anhydride) and carboxylic acid esters (in particular activated esters, such as, for example, carboxylic acid phenyl esters and carboxylic acid nitrophenyl esters). The desactivators are preferably added in dissolved form.

Preferred desactivators are methanol/hydrochloric acid mixtures, methyl iodide, benzyl chloride and chloroformic acid esters.

The linear aliphatic polymers can be isolated by known processes, for example by precipitation with alcohols, filtration and subsequent drying or by direct evaporation of the polymer solution in evaporation units, for example screw extruder and thin layer evaporators.

The process according to the invention for the polymerization of cyclic aliphatic carbonates leads to polymers with a linear structure, the recurring unit having the formula [—CO—O—R—O—], wherein R is given by the monomeric carbonate and corresponds to the residue $R^1$ and $R^2$.

The molar masses of the polycarbonates can be varied over wide ranges. It is possible, via the "molar mass-initiator-monomer-conversion relationship" known to the expert, to built up polycabonates with quite specific molar masses in a controlled manner.

Due to the "living" character of the polymer, when coversion of the monomer is complete the polymerization is started again by renewed addition of monomer and the molar mass is increased further up to a limit given by the abovementioned relationship.

The molar masses of the linear aliphatic polycarbonates can be 2 kg/mol to 500 kg/mol, preferably 20 kg/mol to 120 kg/mol, that is to say the molecular weights are about 2,000–500,000, preferably 20,000–120,000.

Surprisingly, the heat stability of the polymers according to the invention is largely determined by the desactivator. Whilst the polymers desactivated by means of protons already exhibit molecular degradation at about 270° C., the polymers which are desactivated by electrophilic aprotic compounds, preferably methyl iodide or dimethyl sulphate, are sufficiently stable to heat up to about 300° C.

The linear aliphatic polycarbonates exhibit thermoplastic properties and can be processed by known methods. They can be stabilized, pigmented, given an antistatic or flame-repellent finish or filled with fillers in the known manner.

The decomposition temperatures stated in the following examples are determined by thermal gravimetry with an electron balance. Type Ugine Eyrand model 879 (Setaram, France).

EXAMPLE 1

0.31 ml of sec.-butyllithium (1.4 molar solution in cyclohexane) was added to a solution of 15 g of neopentylglycolcarbonate in 150 ml of toluene at −10° C. under nitrogen. The polymerization time at this temperature was 60 minutes. The reaction mixture was then dissociated by addition of 10 ml of methanol/hydrochloric acid (weight ratio 9:1) and the product was precipitated and then isolated by filtration.

$\overline{M}_w$ (from light scattering): 36,000 g/mol,
Decomposition temperature: 275° C.

EXAMPLE 2

0.16 ml of sec.-butyllithium (1.4 molar solution in cyclohexane) was added to a solution of 22 g of neopentylglycolcarbonate in 300 ml of toluene at −10° C., unter nitrogen. The polymerization time at this temperature was 60 minutes. The reaction mixture was worked up as in Example 1.

$\overline{M}_w$ (from light scattering): 105,000 g/mol,
Decomposition temperature: 280° C.

EXAMPLE 3

0.15 ml of sec.-butyllithium (1.4 molar solution in cyclohexane) was added to a solution of 15 g of trimethylolpropanemonoallylethercarbonate in 150 ml of toluene at −10° C. under nitrogen. The polymerization time at this temperature was 60 minutes.

The reaction mixture was decomposed with methyl iodide. The reaction product was isolated by evaporating off the solvent and was kept under nitrogen in the presence of stabilizers.

$\overline{M}_w$ (from light scattering): 78,000 g/mol.

EXAMPLE 4

0.5 ml of sec.-butyllithium (1.4 molar under solution in cyclohexane) was added to a solution of 15 g of neopentylglycolcarbonate in 150 ml of toluene at −10° C. under nitrogen. The reaction time at this temperature was 60 minutes. The polymer was desactivated by methyl iodide. The reaction product was isolated by precipitation.

$\overline{M}_w$ (from light scattering): 23,000 g/mol,
Decomposition temperature: 305° C.

EXAMPLE 5

0.15 ml of sec.-butyllithium (1.4 molar solution in cyclohexane) was added to a solution of 15 g of neopentylglycolcarbonate in 150 ml of tetrahydrofuran at −30° C. under nitrogen. The reaction time at the temperature mentioned was 30 minutes. The reaction mixture was worked up as in Example 1.

$\overline{M}_w$ (from light scattering): 87,000 g/mol,
Decomposition temperature: 280° C.

EXAMPLE 6 (Comparison Experiment)

0.30 ml of sec.-butyllithium (1.4 molar solution in cyclohexane) was added to a solution of 15 g of neopentylglycolcarbonate in 150 ml of toluene. The reaction time at the temperature mentioned was 60 minutes.

Since the reaction was above the ceiling temperature of polyneopentylglycolcarbonate, no polymer was to be isolated.

We claim:

1. A process for the production of a linear aliphatic polycarbonate in which a cyclic aliphatic carbonate of the general formula (I)

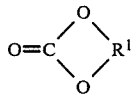

(I)

wherein

R$^1$ denotes —(CH$_2$)$_n$—, —CH$_2$CH$_2$CH(CH$_3$)—, —CH$_2$CH$_2$OCH$_2$CH$_2$OCH$_2$CH$_2$—,

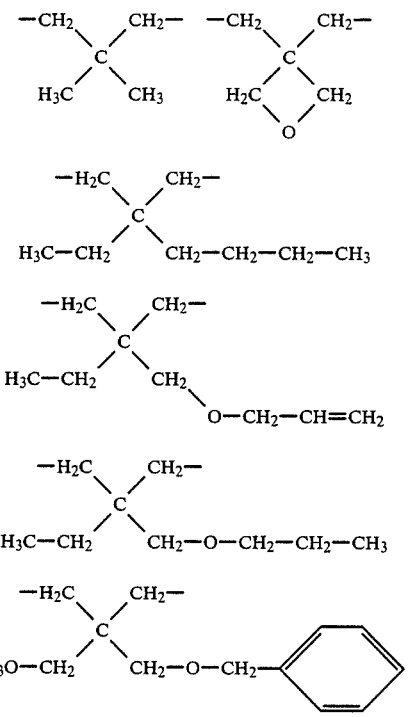

wherein n is 3, 4, 5 or 6, or of the general formula (II)

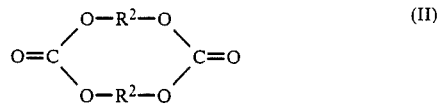

(II)

wherein

R$^2$ denotes —(CH$_2$)$_m$—, —CH$_2$CH$_2$OCH$_2$CH$_2$— or —CH$_2$CH$_2$OCH$_2$CH$_2$OCH$_2$CH$_2$— wherein m is an integer from 4 to 12, is polymerized in the presence of an aprotic organic solvent with the exclusion of atmospheric oxygen and atmospheric moisture, an organometallic compound of an element of main group 1 of the periodic table being used as initiator, the monomer/solvent ratio being in the range from 1 part by weight to 50 parts by weight of monomer per 100 parts by weight of solvent and the polymerization temperature being between −100° C. and +20° C.

2. A process according to claim 1, in which the monomer/solvent weight ratio is 5 parts by weight to 20 parts by weight of monomer per 100 parts by weight of solvent.

3. A process according to claim 1, in which the polymerization temperature is in the range from −50° C. to 0° C.

4. A process according to claim 1, in which the cyclic aliphatic carbonate is of the formula (III)

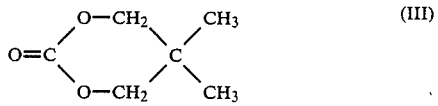

(III)

5. A process according to claim 1, in which the initiator is n-butyllithium or sec.-butyllithium.

6. A process according to claim 1, in which the aprotic organic solvent is selected form aromatic hydrocarbons, aliphatic, hydrocarbons, cyclic ethers or mixtures of cyclic ethers with aromatic or aliphatic hydrocarbons.

7. A process according to claim 1, in which the aprotic solvent is toluene or tetrahydrofuran.

* * * * *